(12) United States Patent
Tomita et al.

(10) Patent No.: US 12,468,362 B2
(45) Date of Patent: Nov. 11, 2025

(54) METHOD OF MANAGING ELECTRIC POWER SUPPLY AND DEMAND, AND SERVER

(71) Applicant: TOYOTA JIDOSHA KABUSHIKI KAISHA, Toyota (JP)

(72) Inventors: Mitsuaki Tomita, Toyota (JP); Hiroshi Ashida, Aichi-ken (JP); Kenji Tahara, Toyota (JP); Tamaki Ozawa, Toyota (JP); Takenori Shimizu, Inuyama (JP); Tetsuro Kuniyoshi, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 45 days.

(21) Appl. No.: 18/369,954

(22) Filed: Sep. 19, 2023

(65) Prior Publication Data
US 2024/0160263 A1    May 16, 2024

(30) Foreign Application Priority Data
Nov. 14, 2022 (JP) .................... 2022-181853

(51) Int. Cl.
*G06F 1/26* (2006.01)
*B60L 53/63* (2019.01)
(Continued)

(52) U.S. Cl.
CPC ............... *G06F 1/26* (2013.01); *B60L 53/63* (2019.02); *B60L 53/68* (2019.02); *G06Q 30/0605* (2013.01); *H02J 7/0013* (2013.01); *B60L 55/00* (2019.02); *B60L 2250/12* (2013.01); *G06Q 30/0207* (2013.01); *G06Q 30/0224* (2013.01); *G06Q 50/06* (2013.01); *G06Q 50/40* (2024.01);
(Continued)

(58) Field of Classification Search
CPC ...... B60L 2250/12; B60L 53/63; B60L 53/68; B60L 55/00; G06F 1/26; G06Q 30/0207; G06Q 50/06; G06Q 50/40; H02J 13/00024; H02J 2310/48; H02J 3/144; H02J 7/00034; H02J 7/0013
See application file for complete search history.

(56) References Cited

U.S. PATENT DOCUMENTS

2009/0005963 A1* 1/2009 Jarvinen ............ G01C 21/3438
                                                                701/533
2017/0129359 A1* 5/2017 Dunlap ................. B60L 53/14
(Continued)

FOREIGN PATENT DOCUMENTS

JP    2010-15270 A    1/2010
JP    2015-14887 A    1/2015
(Continued)

*Primary Examiner* — Terrell S Johnson
(74) *Attorney, Agent, or Firm* — Sughrue Mion, PLLC (57) ABSTRACT

A method of managing electric power supply and demand with a computer includes sending, from the computer, a message for making a request of an electrified vehicle with a driver and a passenger to participate in a demand response for adjusting supply or demand of electric power in a power grid, acquiring, by the computer, passenger information on at least one of an attribute and a preference of the passenger, and setting, by the computer, a first incentive for prompting the passenger to participate in the demand response based on the passenger information.

11 Claims, 6 Drawing Sheets

(51) Int. Cl.
*B60L 53/68* (2019.01)
*B60L 55/00* (2019.01)
*G06Q 30/0207* (2023.01)
*G06Q 30/0601* (2023.01)
*G06Q 50/06* (2024.01)
*G06Q 50/40* (2024.01)
*H02J 3/14* (2006.01)
*H02J 7/00* (2006.01)
*H02J 13/00* (2006.01)

(52) U.S. Cl.
CPC ........... *H02J 3/144* (2020.01); *H02J 7/00034* (2020.01); *H02J 13/00024* (2020.01); *H02J 2310/48* (2020.01)

(56) References Cited

U.S. PATENT DOCUMENTS

2020/0317075 A1    10/2020    Yokoyama et al.
2022/0194252 A1    6/2022     Orihashi et al.

FOREIGN PATENT DOCUMENTS

| JP | 2021-32698 A | 3/2021 |
| JP | 2022-98873 A | 7/2022 |
| WO | 2019/130930 A1 | 7/2019 |

\* cited by examiner

<< DRIVER INFORMATION >>

142

| DRIVER ID | VEHICLE ID | SEX | AGE | MEAL | RECREATION | SIGHTSEEING | ... |
|---|---|---|---|---|---|---|---|
| U-1 | V-1 | *** | *** | *** | *** | *** | ... |
| U-2 | V-2 | *** | *** | *** | *** | *** | ... |
| U-3 | V-3 | *** | *** | *** | *** | *** | ... |
| ⋮ | ⋮ | ⋮ | ⋮ | ⋮ | ⋮ | ⋮ | |

FIG. 4

<< PASSENGER INFORMATION >>

143

| PASSENGER ID | DRIVER ID | SEX | AGE | MEAL | RECREATION | SIGHTSEEING | ... |
|---|---|---|---|---|---|---|---|
| P-1 | D-1 | *** | *** | *** | *** | *** | ... |
| P-2 | D-2 | *** | *** | *** | *** | *** | ... |
| P-3 | D-3 | *** | *** | *** | *** | *** | ... |
| ⋮ | ⋮ | ⋮ | ⋮ | ⋮ | ⋮ | ⋮ | |

METHOD OF MANAGING ELECTRIC POWER SUPPLY AND DEMAND, AND SERVER

CROSS-REFERENCE TO RELATED APPLICATION

This application claims priority to Japanese Patent Application No. 2022-181853 filed on Nov. 14, 2022, incorporated herein by reference in its entirety.

BACKGROUND

1. Technical Field

The disclosure relates to a method of managing electric power supply and demand, and a server.

2. Description of Related Art

A technology for using a battery mounted on an electrified vehicle is suggested to adjust the supply and demand of electric power (to level electric power supply and demand) in a power grid. For example, WO 2019/130930 describes that, for this purpose, participation of an owner of an electrified vehicle or a user of a parking lot in leveling electric power supply and demand is facilitated. A vehicle management system described in WO 2019/130930 includes a reward point setting unit and is configured to set reward points for a user associated with a parked vehicle.

SUMMARY

The inventors focused attention on that occupants other than a driver of an electrified vehicle can be involved in adjusting the supply or demand of electric power. For this reason, giving only an incentive like reward points described in WO 2019/130930 to a driver sometimes does not facilitate participation in adjusting electric power supply and demand. WO 2019/130930 is silent about such a viewpoint.

The disclosure further reliably facilitates participation in adjusting electric power supply and demand.

(1) A first aspect of the disclosure provides a method of managing electric power supply and demand with a computer. The method includes (A) sending, from the computer, a message for making a request of an electrified vehicle with a driver and a passenger to participate in a demand response for adjusting supply or demand of electric power in a power grid, (B) acquiring, by the computer, passenger information on at least one of an attribute and a preference of the passenger, and (C) setting, by the computer, a first incentive for prompting the passenger to participate in the demand response based on the passenger information.

With the method of (1), the first incentive is set for the passenger as a consideration for participation of the electrified vehicle in adjusting electric power supply and demand (DR (described later)). The first incentive is set based on at least one of the attribute and the preference of the passenger, so the first incentive is to strongly prompt the passenger to participate in DR. With this configuration, cooperation of the passenger is easily obtained, so it is possible to participate in DR as long as the driver desires to participate. Thus, with the method of (1), it is possible to further reliably facilitate participation in adjusting electric power supply and demand.

(2) The method may further include acquiring, by the computer, driver information on at least one of an attribute and a preference of the driver, and setting, by the computer, a second incentive for prompting the driver to participate in the demand response based on the driver information.

With the method of (2), the second incentive is also set for the driver as a consideration for participation in DR. In other words, the incentive is set for each of the driver and the passenger. With this configuration, it is possible to further reliably facilitate participation in adjusting electric power supply and demand.

(3) The preference of the passenger may be learned based on an activity of the passenger to acquire the passenger information.

(4) The attribute or the preference of the passenger may be estimated based on an answer of the passenger for a question to acquire the passenger information.

(5) The attribute or the preference of the passenger may be estimated based on image data of the passenger, taken by a camera, or voice data of the passenger, recorded by a smart speaker, to acquire the passenger information.

With the methods of (3) to (5), it is possible to further accurately estimate the attribute or the preference of the passenger. With this configuration, the first incentive that matches the attribute or the preference of the passenger can be set. As a result, it is possible to further strongly prompt the passenger to participate in DR.

(6) When the first incentive is set, the electrified vehicle may be guided to a place where an activity preferred by the passenger is allowed to be performed, based on location information of the electrified vehicle.

With the method of (6), when the electrified vehicle is guided to a place where an activity preferred by the passenger is allowed to be performed, it is possible to allow the electrified vehicle to participate in DR in an appropriate place according to electric power supply and demand.

(7) The first incentive based on the passenger information may be set by using an estimation model that is a program subjected to machine learning processing.

(8) The first incentive may be displayed on a user equipment of the passenger.

(9) Whether the passenger has accepted the first incentive may be acquired from the user equipment.

(10) A second aspect of the disclosure provides a server that makes a request of an electrified vehicle with a driver and a passenger to participate in a demand response for adjusting supply or demand of electric power in a power grid. The server includes a processor, and a memory storing a program that is executable by the processor. The processor is configured to acquire passenger information on at least one of an attribute and a preference of the passenger, set an incentive for prompting the passenger to participate in the demand response based on the passenger information, and send a message with the incentive to the passenger.

With the configuration of (10), as in the case of the method of (1), it is possible to further reliably facilitate participation in adjusting electric power supply and demand.

According to the aspects of the disclosure, it is possible to further reliably facilitate participation in adjusting supply or demand of electric power.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described in detail with reference to the accompanying drawings. Like reference signs denote the same or corresponding portions in the drawings, and the description thereof will not be repeated.

In the aspects of the disclosure and the embodiment, the term "supply and demand" of electric power means at least one of supply and demand of electric power. In other words, the term "supply and demand" of electric power may mean only demand of electric power, may mean only supply of electric power, or may mean both demand and supply of electric power.

In the aspects of the disclosure and the embodiment, the term "charging or discharging" of a vehicle means at least one of charging and discharging of a vehicle. In other words, only charging of a vehicle may be performed, only discharging of a vehicle may be performed, or both charging and discharging of a vehicle may be performed.

EMBODIMENT

System Configuration

Figure 1:
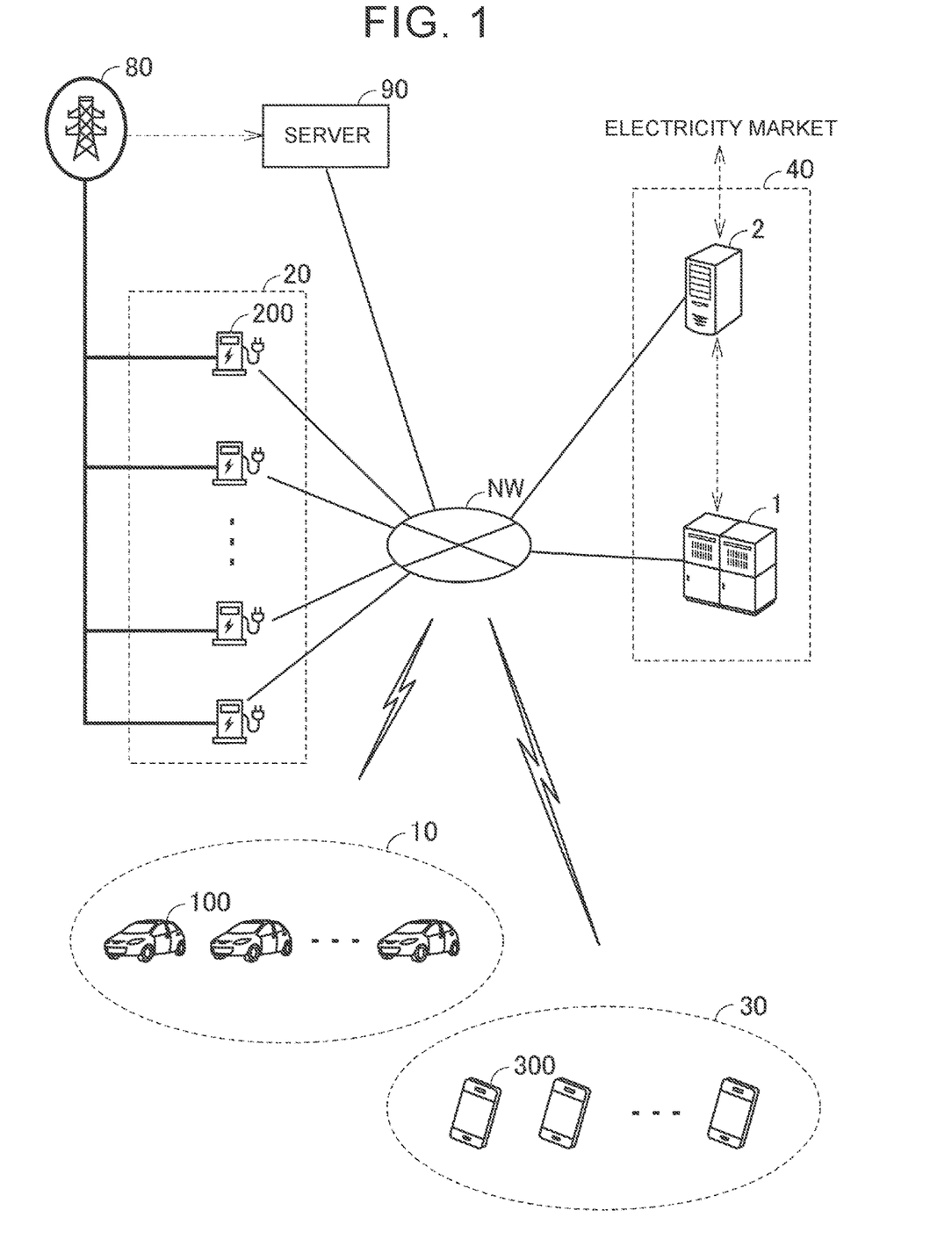
FIG. 1 is a diagram that shows a schematic configuration of an electrical power system according to an embodiment of the disclosure.

FIG. 1 is a diagram that shows a schematic configuration of an electrical power system according to the embodiment of the disclosure. The electrical power system includes a vehicle group 10, an electric vehicle power supply equipment (EVSE) group 20, a user equipment (UE) group 30, an electrical grid 80, a server 90, and a power management server 40. The power management server 40 includes a first server 1 and a second server 2.

The electrical grid 80 is a power grid constructed of a power collection system. The electrical grid 80 supplies alternating-current power (for example, three-phase alternating-current power) to the equipments (for example, the EVSE group 20) in the grid. In this embodiment, a power company may be regarded as a transmission system operator (TSO) of the electrical grid 80 (commercial power supply).

The server 90 is a computer that belongs to the TSO. The server 90 incorporates the system of a central load dispatching and liaison office and a simple command system.

The vehicle group 10 includes a plurality of vehicles 100 respectively electrically connected to EVSEs. Each of the vehicles 100 included in the vehicle group 10 is an xEV and is configured to operate as an adjustment force for the electrical grid 80. In the present embodiment, each of the vehicles 100 is a vehicle (personally owned vehicle (POV)) typically owned by an individual person. The number of vehicles 100 included in the vehicle group 10 is selectable. Each of the vehicles 100 has a vehicle configuration (see FIG. 2) (described later).

The EVSE group 20 includes a plurality of EVSEs 200 that receive electric power supplied from the electrical grid 80. The EVSE group 20 may include multiple types of EVSEs (for example, a standard charger and a quick charger). The EVSEs 200 may include both a public EVSE (EVSE installed in a commercial facility, a parking area of an expressway, or the like) and a nonpublic EVSE (for example, a domestic EVSE). The number of EVSEs 200 included in the EVSE group 20 is selectable.

The user equipment group 30 includes a plurality of user equipments 300 respectively operated by users of the vehicles. Users may be drivers or may be passengers (fellow passengers) other than drivers. Each of the user equipments 300 included in the user equipment group 30 may be a mobile terminal or may be a fixed terminal. Examples of the mobile terminal include a smartphone, a tablet, a notebook personal computer (PC), and a wearable device (such as a smart watch). Examples of the fixed terminal include a desktop PC. The number of user equipments 300 included in the user equipment group 30 is selectable. Each of the user equipments 300 has a device configuration (see FIG. 2) (described later).

The vehicles 100 included in the vehicle group 10, the EVSEs 200 included in the EVSE group 20, the user equipments 300 included in the user equipment group 30, the server 90, and the power management server 40 are connected to a network NW. The network NW is, for example, a wide area network constructed of the Internet and a wireless base station. The first server 1 periodically communicates with each of the vehicles 100 included in the vehicle group 10 and each of the user equipments 300 included in the user equipment group 30 via the communication network NW. The second server 2 periodically communicates with each of the EVSEs 200 included in the EVSE group 20 via the communication network NW. The server 90 communicates with the second server 2 via the communication network NW. The first server 1 and the second server 2 are connected so as to be capable of communicating with each other.

The first server 1 is, for example, a computer that belongs to an automobile manufacturer. The second server 2 is, for example, a computer that belongs to an aggregator. The aggregator is an electric power supplier that binds a plurality of distributed energy resources (DER) to provide power management service. The first server 1 and the second server 2 may belong to the same business operator. For example, in addition to the second server 2, the first server 1 may also belong to the aggregator. Alternatively, the first server 1 and the second server 2 may be integrated.

The first server 1 includes a database in which information on each of the vehicles 100 included in the vehicle group 10 (hereinafter, referred to as "vehicle information") is stored. The first server 1 sequentially receives the vehicle information of each of the vehicles 100 included in the vehicle group 10 by periodical communication with the vehicle 100 and updates the vehicle information.

The DERs in the present embodiment include the vehicles 100 included in the vehicle group 10. The second server 2 causes the plurality of DERs including the vehicles 100 included in the vehicle group 10 to function as a virtual power plant (VPP) by remote control over the DERs.

More specifically, the second server 2 issues a demand response (DR) to each of the DERs to cause the DERs to function as a VPP. The DR may be regarded as "adjusting supply or demand of electric power" according to the disclosure. The second server 2 sends a DR request message to each of the DERs before starting DR. The DR request message includes the type of DR (a raising DR, a lowering DR, or the like), a DR region (an installation location of an EVSE, or the like), and a DR period (DR start time, DR end time, or the like). The raising DR is basically a DR for making a request to increase demand. The lowering DR is a DR for making a request to suppress demand or reverse power flow. The second server 2 causes the plurality of DERs to adjust the electric power of the electrical grid 80, requested from the server 90, or to adjust the electric power of the electrical grid 80, bid in the electricity market, by using a DR. Hereinafter, making a request to participate in DR by sending a DR request message from the second server 2 is also referred to as "DR participation request". The DR request message may be regarded as a "message" according to the disclosure.

When a manager of a DER agrees to a DR participation request, the second server 2 is allowed to execute remote control over the DER. Thus, the second server 2 is allowed to control the DER such that the electric power of the electrical grid 80 is adjusted (charging is facilitated, charging is suppressed, discharging or electric power consumption is facilitated, or electric power consumption is suppressed) by the DER. Adjusting electric power may be, for example, any one of adjusting demand, stabilizing a power supply, following load, and adjusting frequency. When, for example, an imbalance is predicted to occur for the same time and same amount of the electrical grid 80, the second server 2 may control the DER such that the imbalance is resolved.

Figure 2:
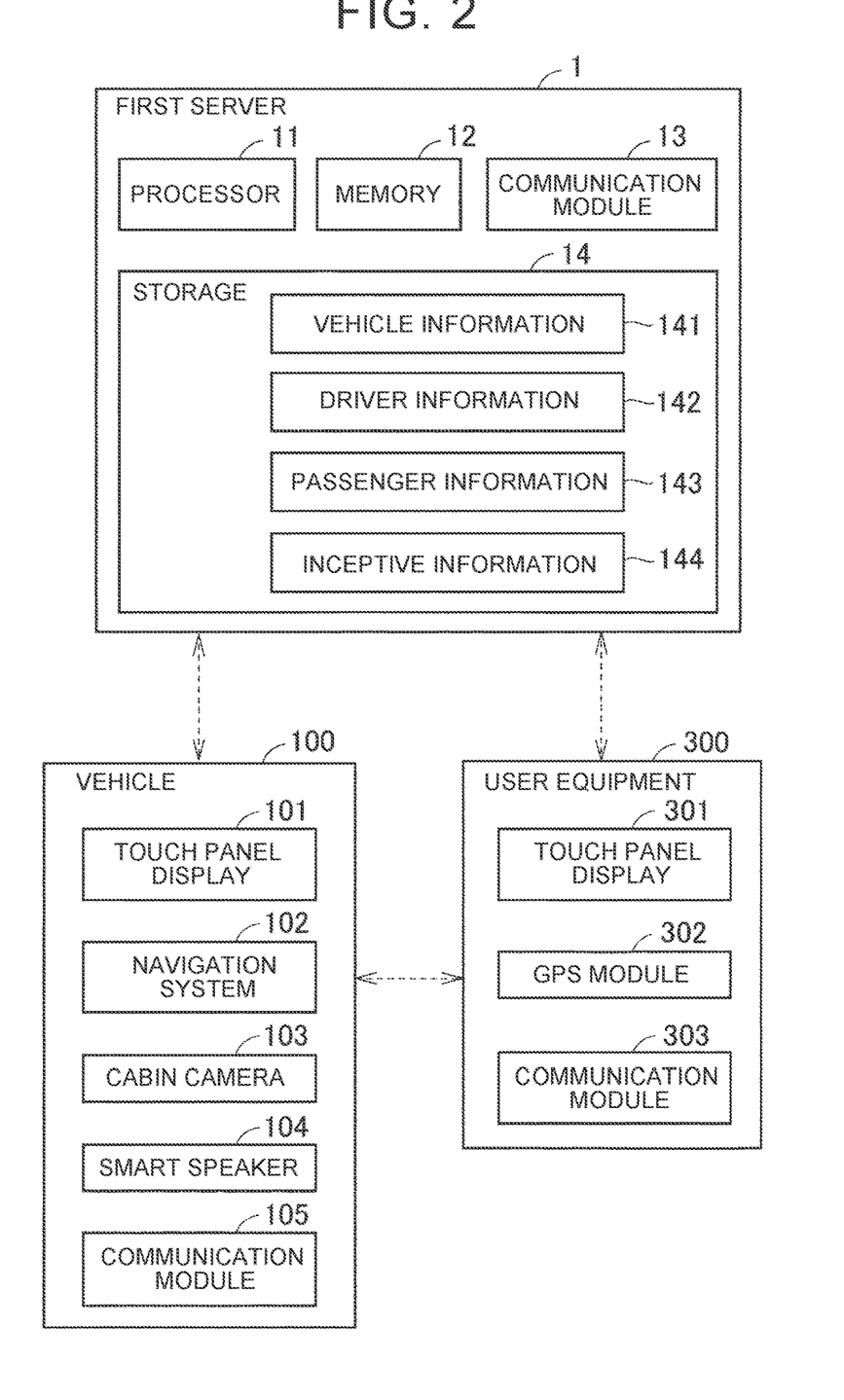
FIG. 2 is a diagram that shows the configuration of a first server, a vehicle, and a user equipment.

FIG. 2 is a diagram that shows the configuration of the first server 1, the vehicle 100, and the user equipment 300. The first server 1 includes a processor 11, a memory 12, a communication module 13, and a storage 14.

The processor 11 is an arithmetic processing unit, such as a central processing unit (CPU) and a micro-processing unit (MPU). The memory 12 is a volatile memory, such as a random access memory (RAM). The communication module 13 controls data communication between the first server 1 and another apparatus (the second server 2, the vehicle 100, the user equipment 300, or the like). The storage 14 is a rewritable nonvolatile memory, such as a hard disk drive (HDD), a solid state drive (SSD), and a flash memory. A system program including an operating system (OS) and a control program including computer-readable code needed for arithmetic processing are stored in the storage 14. The processor 11 implements various processes by reading the system program and the control program, expanding the system program and the control program on the memory 12, and running the system program and the control program.

The storage 14 includes a plurality of databases. Vehicle information 141, driver information 142, passenger information 143, and incentive information 144 are respectively stored in the plurality of databases.

The vehicle information 141 is information on each of the vehicles 100 included in the vehicle group 10 as described above. The vehicle information 141 includes, for example, a vehicle ID (identification information of a vehicle), information on a state of charge (SOC) and/or an amount of electricity of a battery (electrical storage device) mounted on the vehicle 100, information on a scheduled travel route (a current location, a stopover, a destination, estimated arrival time at each point, and the like) of the vehicle 100, and information on an answer of the vehicle 100 to a DR participation request. The vehicle information 141 may further include information on the specifications (vehicle type, vehicle body size, battery capacity, and the like) of the vehicle 100.

Subsequently, the driver information 142 and the passenger information 143 will be described. For a privately owned vehicle (POV), a driver and a passenger are often in a close relationship. The driver and the passenger are, for example, parent and child, husband and wife (lovers), or friends. The driver information 142 and the passenger information 143 can be suitably used for users (the driver and the passenger) in such a close relationship.

Figure 3:
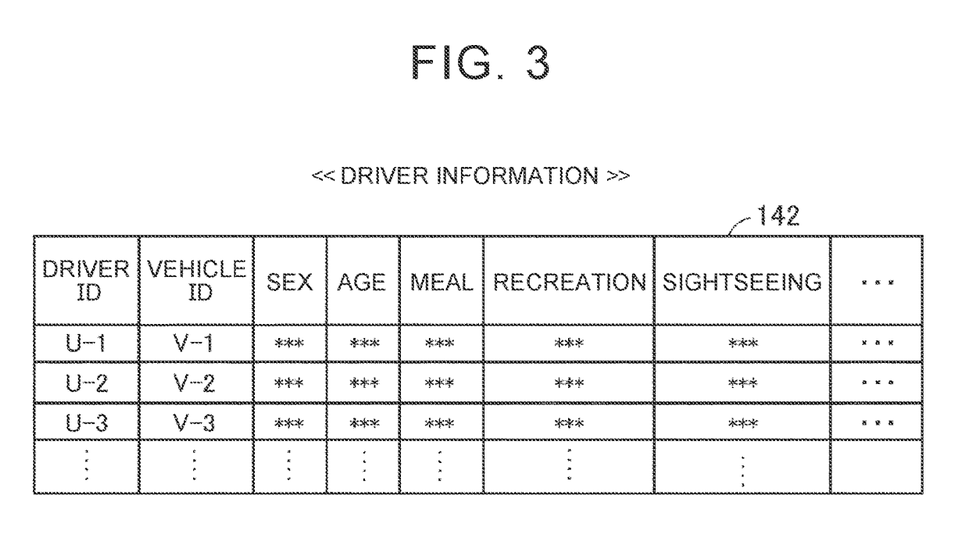
FIG. 3 is a conceptual view that shows an example of driver information.

FIG. 3 is a conceptual view that shows an example of the driver information 142. The driver information 142 is information on mainly the attribute and/or the preference of the driver of each of the vehicles 100. The driver information 142 includes, for example, a driver ID (identification information of a driver), a vehicle ID for associating the driver with the vehicle 100, attribute information (sex, age, address, family make-up, physical constitution, religion, and the like) of the driver, and preference information on an activity (meal, recreation, sightseeing spot, and the like) preferred by the driver. The driver information 142 may include an activity history (information indicating places the driver has visited in the past) of the driver.

Figure 4:
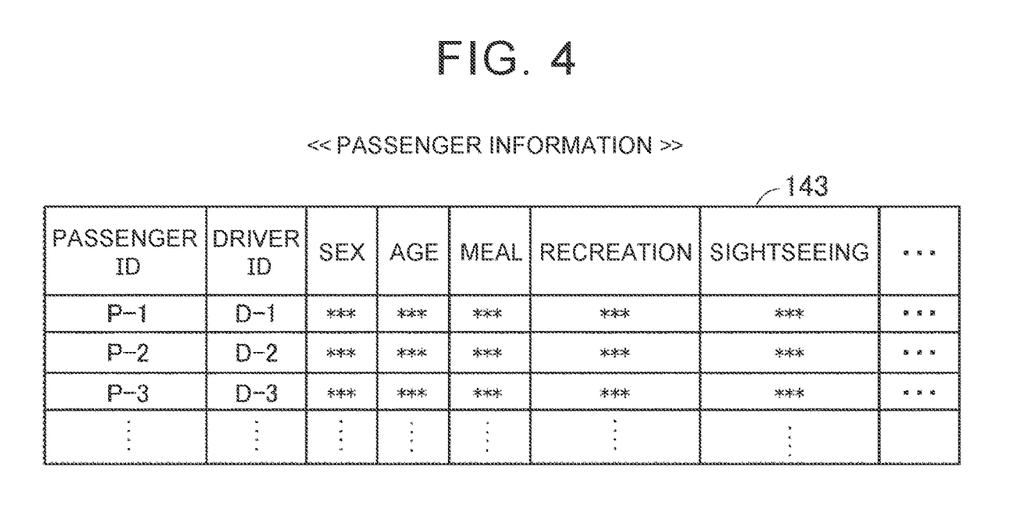
FIG. 4 is a conceptual view that shows an example of passenger information.

FIG. 4 is a conceptual view that shows an example of the passenger information 143. The passenger information 143 is information on mainly the attribute and/or the preference of the passenger of each of the vehicles 100. The passenger information 143 includes a passenger ID (identification information of a passenger), a driver ID (which may be a vehicle ID instead of or in addition to a driver ID) for associating the passenger with a driver, attribute information of the passenger, and preference information of the passenger. The passenger information 143 may include an activity history of a passenger.

For example, the driver inputs attribute information and preference information in advance by operating the user equipment 300. The details input are sent from the user equipment 300 to the first server 1 and stored in the database in the storage 14 as the driver information 142. However, how to acquire the driver information 142 is not limited to the one based on operation.

For example, preference information of the driver may be estimated from the attribute information and the activity history of the driver by using a trained model prepared in advance through machine learning. The same applies to the passenger information 143.

Alternatively, a question about the attribute or the preference of the driver is made from the vehicle 100 to the driver, and the attribute or the preference of the driver may be estimated based on an answer of the driver to the question. The same applies to the passenger information 143.

Referring back to FIG. 2, the incentive information 144 is information on an incentive given to the user of each of the vehicles 100. The incentive information 144 will be described later.

The vehicle 100 includes a touch panel display 101, a navigation system 102, a cabin camera 103, a smart speaker 104, and a communication module 105.

The touch panel display 101 receives input from the user (for example, the driver) or displays various pieces of information (map information, DR participation request, and the like). These pieces of information may be displayed on another display, such as a meter panel, instead of or in addition to the touch panel display 101.

The navigation system 102 includes a global positioning system (GPS) module. The GPS module receives signals (GPS signals) from GPS satellites (not shown). The navigation system 102 detects the location of the vehicle 100 by using GPS signals and displays the location of the vehicle 100 on a map in real time.

The cabin camera 103 captures an image in a vehicle cabin. It is possible to estimate the number, attributes (sex, age, and the like), and preferences (a game lover, a book lover, and the like) of occupants (a driver and passengers) in a vehicle cabin based on image data captured by the cabin camera 103. Therefore, the cabin camera 103 is used to acquire the driver information 142 and the passenger information 143.

The smart speaker 104 records voice in the vehicle cabin. It is possible to estimate the number, attributes, preferences, and the like of occupants in the vehicle cabin based on voice data recorded by the smart speaker 104. Therefore, the smart speaker 104, as in the case of the cabin camera 103, is used to acquire the driver information 142 and the passenger information 143.

The communication module 105 sends and receives various pieces of information with the first server 1 and the user equipment 300.

The user equipment 300 includes a touch panel display 301, a GPS module 302, and a communication module 303. The functions of these component elements are similar to the functions of the corresponding component elements of the vehicle 100, so the description will not be repeated.

Incentive

The power management server 40 gives the manager of each of the DERs an incentive as a consideration for participation in DR. More specifically, the first server 1 in the power management server 40 gives each of the users of the vehicles 100 an incentive. In the present embodiment, the users that each receive an incentive include not only drivers but also passengers. This is because, if no incentive is given to a passenger, it can be estimated that, even when a driver (typically, a parent) agrees to participation in DR, a passenger (child) refuses to participate in DR for reasons "the passenger (child) does not want to bother moving to a charging station (an installation location of an EVSE)", "the passenger (child) does not want to stay at a charging station", or the like to make it difficult to participate in DR of the vehicle 100. In light of such a situation, it is desirable to obtain agreement and cooperation to DR participation by giving an incentive to a passenger.

The users (driver and passenger) of each of the vehicles 100 included in the vehicle group 10 each are allowed to receive an incentive when the vehicle 100 adjusts electric power in accordance with a DR command on condition that a contract with the aggregator is made in advance.

Hereinafter, an incentive given to a passenger is referred to as "first incentive", and an incentive given to a driver is referred to as "second incentive". The first server 1 desirably gives a first incentive to a passenger based on passenger information. The first server 1 may, for example, set the details (type) of the first incentive as follows.

Figure 5:
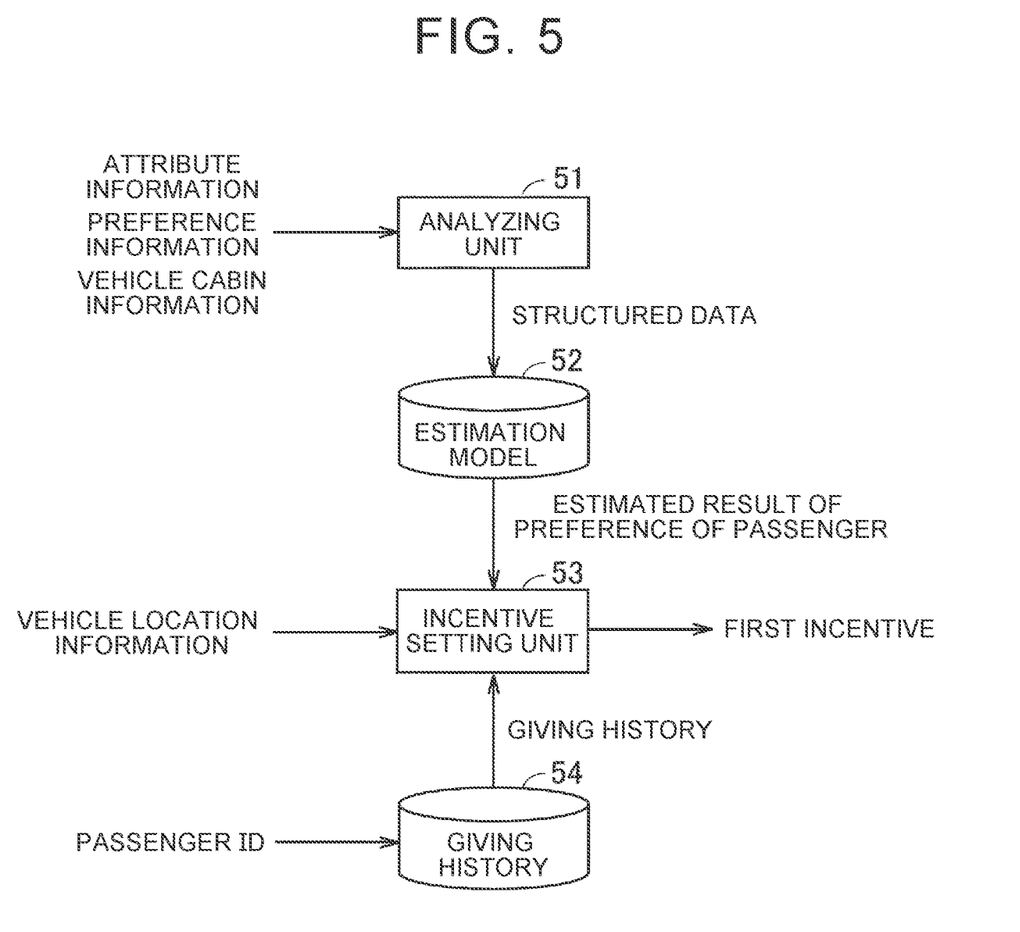
FIG. 5 is a diagram for illustrating an example of a technique to set a first incentive.

FIG. 5 is a diagram for illustrating an example of a technique to set a first incentive. The first server 1 includes, for example, an analyzing unit 51, an estimation model 52, an incentive setting unit 53, and a giving history 54. The analyzing unit 51 and the incentive setting unit 53 are implemented by the processor 11 (see FIG. 2). The estimation model 52 and the giving history 54 are part of the incentive information 144 (see FIG. 2).

The analyzing unit 51 identifies a passenger in the vehicle cabin. To identify a passenger, image data captured by the cabin camera 103 may be used, voice data recorded by the smart speaker 104 may be used, location information (GPS information) of the user equipment 300 carried by the passenger may be used. The analyzing unit 51 acquires attribute information and preference information (see FIG. 4) of the passenger stored as the passenger information 143 for each passenger in the vehicle cabin. The analyzing unit 51 may acquire vehicle cabin information indicating an activity (during playing a game, during reading a book, during listening to music, during sleeping, the details of conversation, and the like) of the passenger in the vehicle cabin. The vehicle cabin information can be acquired with the cabin camera 103, the smart speaker 104, and the like.

The analyzing unit 51 specifies a value (numeric value or true/false) corresponding to an item registered in advance by executing an analyzing process on each piece of information acquired. The analyzing unit 51 generates structured data by combining one or more values specified. The structured data includes, for example, sex, age, the type of a like/unlike activity (meal, recreation, sightseeing spot, or the like), whether playing a game, whether reading a book, whether listening to music, whether sleeping, whether being hungry, and the like of the passenger. The analyzing unit 51 outputs the structured data generated to the estimation model 52.

The estimation model 52 is, for example, a program subjected to machine learning processing for performing calculation according to a model (trained model). An example of an algorithm of the estimation model 52 is logistic regression; however, an algorithm that the estimation model 52 follows is not limited. For each of multiple types of incentives prepared in advance, the estimation model 52 estimates whether the passenger likes the incentive based on structured data. The estimation model 52 may derive a probability (likelihood) that the passenger likes the incentive. The estimation model 52 outputs an estimated result to the incentive setting unit 53. A technique to estimate an incentive that the passenger likes is not limited to the one using a trained model. For example, a relational expression between an incentive and structured data may be prepared by multivariable analysis, such as multiple regression analysis, where the incentive is a response variable and the structured data is an explanatory variable.

The incentive setting unit 53 sets a first incentive to be given to the passenger based on the result estimated by the estimation model 52. Examples of the first incentive include a discount on an activity that the passenger likes, and preferential treatment, discounts, and points on a game, a book, and music that the passenger likes. The first incentive may be a right, points, or the like exchangeable with goods or service at a designated shop. The first incentive may be a general currency or may be a virtual currency.

The incentive setting unit 53 may acquire vehicle location information collected from the navigation system 102 and set a first incentive further based on the vehicle location information. The incentive setting unit 53 may, for example, limit objects (places where activities, such as meal, recreation, and sightseeing spot, are performed) of the first incentive within a range close to a scheduled travel route of the vehicle 100 or a place where the vehicle 100 participates in DR (charging station). In other words, the incentive setting unit 53 may guide the vehicle 100 to a place where an activity that the passenger likes can be performed, by limiting the objects of the first incentive. Thus, it is possible to cause the vehicle 100 to participate in DR in an appropriate place according to electric power supply and demand, for example, a region where electric power supply is insufficient for electric power demand.

The incentive setting unit 53 may make reference to the giving history 54 of the first incentive and set a first incentive to be given this time further based on the first incentive given to the passenger in the past. In other words, the incentive setting unit 53 may learn the first incentive given to the passenger and set a first incentive to be given to the passenger this time based on the learned result. For example, the incentive setting unit 53 may set an incentive of the same type as the first incentive given to the passenger in the past as the incentive to be given this time. Conversely, the incentive setting unit 53 may avoid the first incentive given to the passenger in the past and set another incentive to be given this time.

When the vehicle 100 participates in DR and predetermined requirements are fulfilled, the incentive setting unit 53 gives the first incentive to the passenger and updates the incentive information 144 (giving history 54). The first server 1 is capable of determining whether the vehicle 100 participates in DR based on a detected value of a watthour meter (such as a smart meter and a watthour meter incorporated in an EVSE) of electric power (power flow/reverse power flow) exchanged between the electrical grid 80 and the EVSE.

It is desirable that the first server 1 give the first incentive to the passenger based on the passenger information 143 and also give the second incentive to the driver based on the driver information 142. How to give the second incentive to the driver is similar to how to give the first incentive to the passenger, so the detailed description will not be repeated.

Flow of Process

Figure 6:
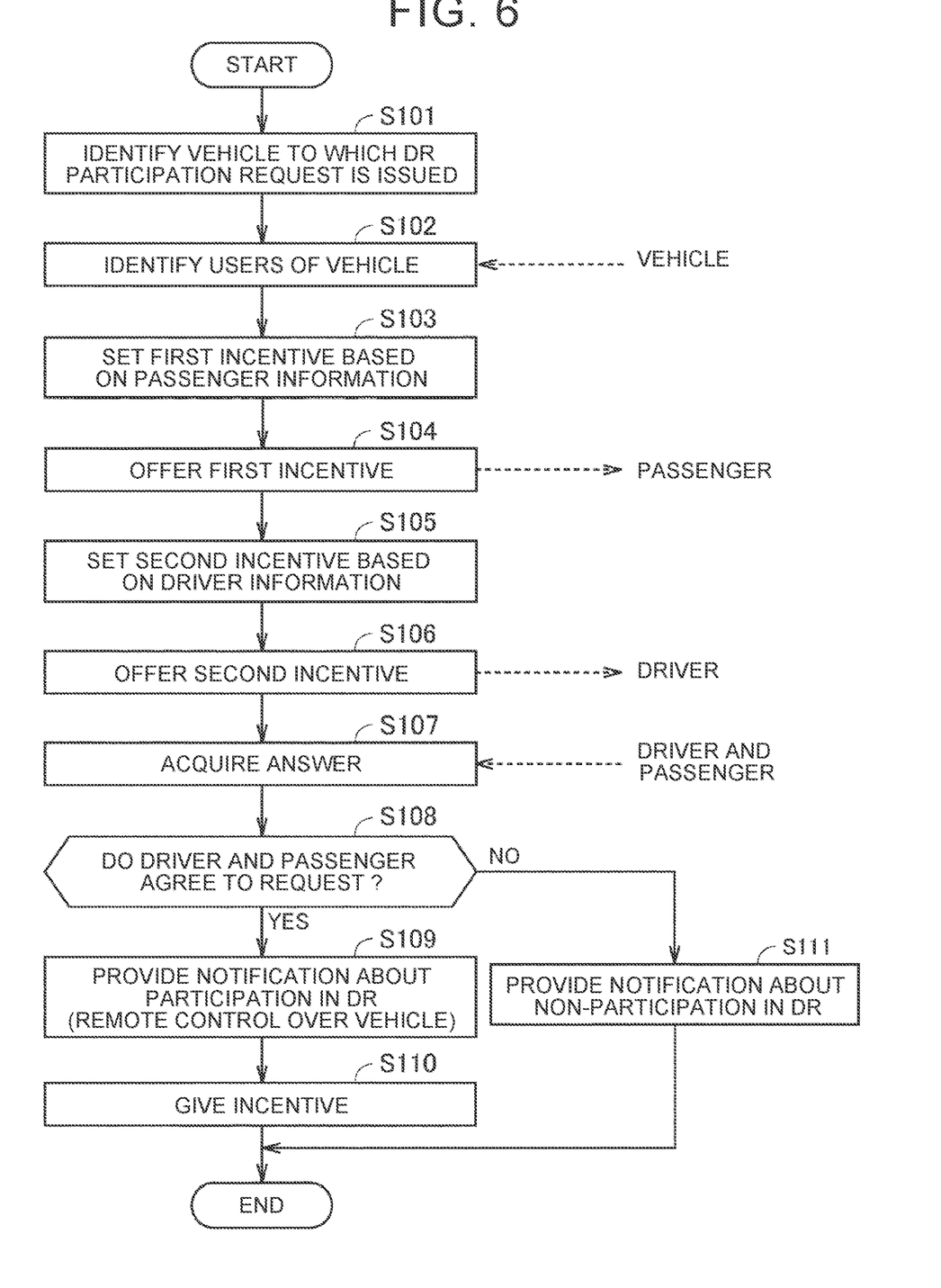
FIG. 6 is a flowchart that shows a procedure related to giving an incentive according to the present embodiment.

FIG. 6 is a flowchart that shows a procedure related to giving an incentive according to the present embodiment. The flowchart is executed when, for example, a predetermined condition is satisfied (for example, at predetermined intervals). Steps are implemented by software processing of the first server 1 (processor 11). Alternatively, steps may be implemented by hardware (electrical circuit) disposed in the first server 1. Hereinafter, "step" is abbreviated as "S".

In S101, the first server 1 identifies the vehicle 100 that receives a DR participation request from the second server 2. The first server 1 is allowed to acquire from the second server 2 which vehicle the second server 2 has sent a DR request message.

In S102, the first server 1 identifies users (a driver and a passenger) in the vehicle 100 identified in S101. Users can be identified based on, for example, notification (a detection result by the cabin camera 103, the smart speaker 104, or the like) from the vehicle 100. Users can also be identified based on the location information of each user equipment 300.

In S103, the first server 1 sets a first incentive based on the passenger information 143 related to the passenger identified in S102. How to set the first incentive has been described in detail with reference to FIG. 5, so the description will not be repeated here. The first server 1 offers the set first incentive to the passenger (S104). More specifically, the first server 1 sends the user equipment 300 carried by the passenger an instruction for causing the user equipment 300 to display the first incentive.

In S105, the first server 1 sets a second incentive based on the driver information 142 related to the driver identified in S102. The first server 1 offers the set second incentive to the driver (S106). More specifically, the first server 1 sends the user equipment 300 carried by the driver an instruction for causing the user equipment 300 to display the second incentive. The order of the process of S103, S104, S105, and S106 can be changed as needed.

Figure 7:
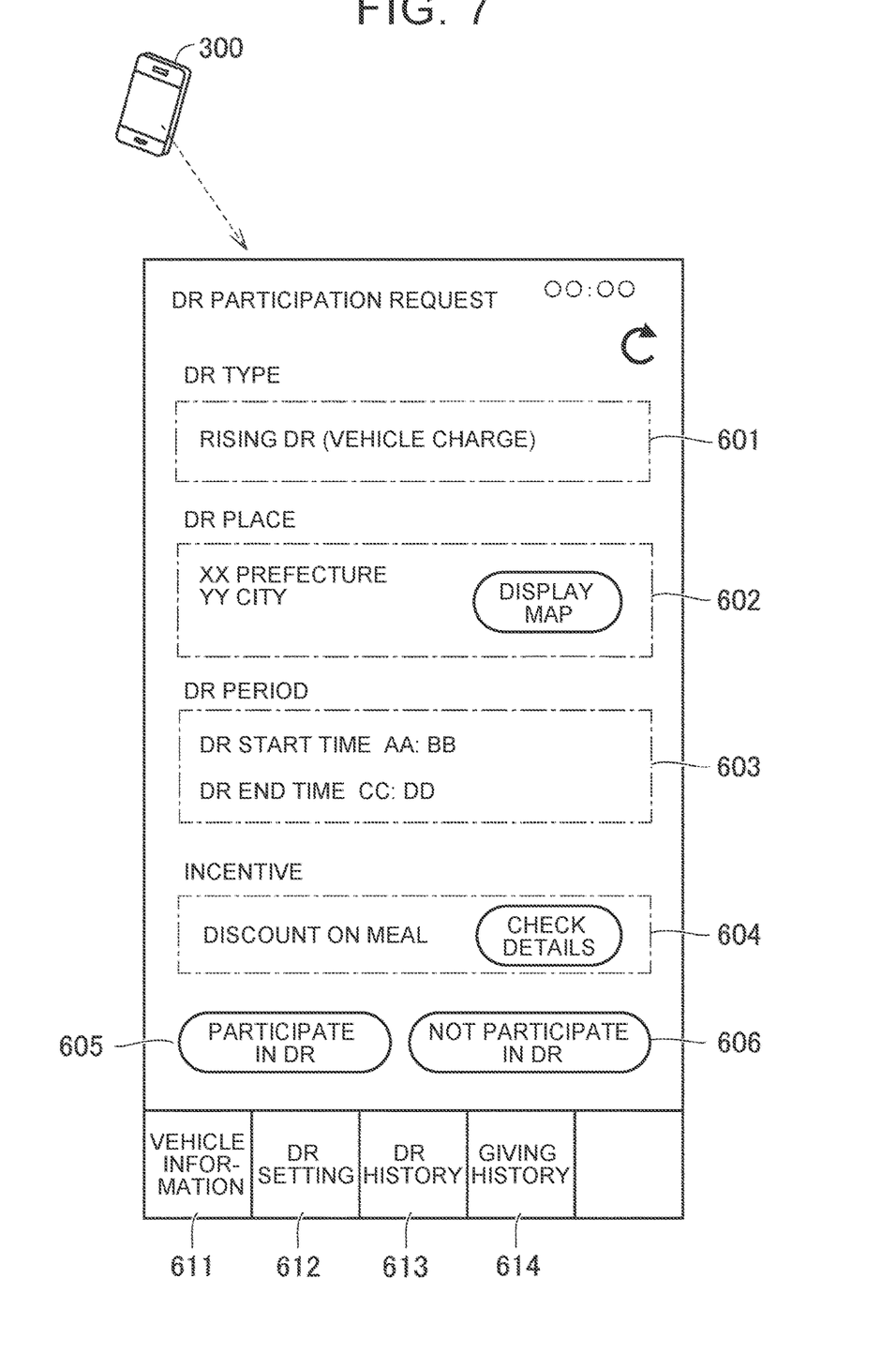
FIG. 7 is a view for illustrating an example of a technique to offer a first incentive.

FIG. 7 is a view for illustrating an example of a technique to offer a first incentive. FIG. 7 schematically shows an example of a display screen of the user equipment 300 of the passenger. For example, a DR type 601, a DR place 602, a DR period 603, an incentive field 604, and buttons 605, 606 are displayed on the user equipment 300. The button 605 is a button for representing an intention that the user (the driver or the passenger) agrees to the DR participation request. On the other hand, the button 606 is a button for representing an intention that the user disagrees with the DR participation request.

FIG. 7 shows an example in which only one incentive is displayed in the incentive field 604. However, the incentive field 604 may be displayed so that the user is able to select a desired incentive from among a plurality of incentive candidates. The first incentive to be given to the passenger may be displayed in the incentive field 604 of the user equipment 300 carried by the driver. Conversely, the second incentive to be given to the driver may be displayed in the incentive field 604 of the user equipment 300 carried by the passenger.

Other items such as vehicle information (such as a current SOC) 611, a DR setting (such as an upper limit/lower limit of a range in which a change in SOC is permitted as a result of DR participation) 612, a history 613 of DR participated in the past, and an incentive gaining history 614 may be displayed on the user equipment 300.

Referring back to FIG. 6, in S107, the first server 1 acquires from the user equipment 300 of the passenger an answer as to whether the passenger accepts the first incentive offered to the passenger. The first server 1 acquires from the user equipment 300 of the driver an answer as to whether the driver accepts the second incentive offered to the driver.

When the passenger accepts the first incentive, the driver accepts the second incentive, and both the driver and the passenger agree to the DR participation request (YES in S108), the first server 1 provides notification to the second server 2 that the vehicle 100 participates in DR (S109). Thus, the second server 2 is allowed to cause the vehicle 100 to function as a VPP by remote control over the vehicle 100. When the vehicle 100 fulfills predetermined requirements on DR (when the vehicle 100 has charged or discharged electric power exceeding a predetermined amount, when the vehicle 100 has functioned as a VPP for a predetermined time or longer, or the like), the first server 1 gives the passenger the first incentive according to the fulfilled requirements and gives the second incentive to the driver (S110).

When at least one of the driver and the passenger disagrees with participation in DR (NO in S108), that is, when the passenger does not accept the first incentive or when the driver does not accept the second incentive or both, the first server 1 provides notification to the second server 2 that the vehicle 100 does not participate in DR (S111). In this case, no incentive is given.

Offering the second incentive to the driver in S105 and S106 is not indispensable. Whether to participate in DR may be determined based on the first incentive for the passenger.

As described above, in the present embodiment, the first incentive is offered to the passenger in the vehicle 100 as a consideration for the vehicle 100 to participate in DR. The first incentive is generated based on the passenger information 143 including the attribute information and/or the preference information of the passenger, so the first incentive strongly prompts the passenger to participate in DR. With this configuration, cooperation of the passenger for the DR participation request is easily obtained, so it is possible to participate in DR as long as the driver desires to participate. Thus, according to the present embodiment, it is possible to further reliably facilitate participation in DR.

The embodiment described above is illustrative and not restrictive in all respects. The scope of the disclosure is not defined by the description of the above-described embodiment, and is defined by the appended claims. The scope of the disclosure is intended to encompass all modifications within the scope of the appended claims and equivalents thereof

What is claimed is:

1. A method of managing electric power supply and demand with a computer, the method comprising:
    sending, from the computer, a message for making a request of an electrified vehicle with a driver and a passenger to participate in a demand response for adjusting supply or demand of electric power in a power grid;
    acquiring, by the computer, passenger information on at least one of an attribute and a preference of the passenger;
    setting, by the computer, a first incentive for prompting the passenger to participate in the demand response based on the passenger information; and
    based upon the passenger accepting the request to participate in the demand response, executing remote control of the electrified vehicle to cause the electrified vehicle to supply power to an electric vehicle power supply charger that is connected to the power grid.

2. The method according to claim 1, further comprising:
    acquiring, by the computer, driver information on at least one of an attribute and a preference of the driver; and
    setting, by the computer, a second incentive for prompting the driver to participate in the demand response based on the driver information.

3. The method according to claim 1, wherein the preference of the passenger is learned based on an activity of the passenger to acquire the passenger information.

4. The method according to claim 1, wherein the attribute or the preference of the passenger is estimated based on an answer of the passenger for a question to acquire the passenger information.

5. The method according to claim 1, wherein the attribute or the preference of the passenger is estimated based on image data of the passenger, taken by a camera, or voice data of the passenger, recorded by a smart speaker, to acquire the passenger information.

6. The method according to claim 1, wherein, when the first incentive is set, the electrified vehicle is guided to a place where an activity preferred by the passenger is allowed to be performed, based on location information of the electrified vehicle.

7. The method according to claim 1, wherein the first incentive based on the passenger information is set by using an estimation model that is a program subjected to machine learning processing.

8. The method according to claim 7, wherein the first incentive is displayed on a user equipment of the passenger.

9. The method according to claim 8, wherein whether the passenger has accepted the first incentive is acquired from the user equipment.

10. The method according to claim 1, wherein the first incentive is at least one of a discount on an activity and preferential treatment, discounts, and points on a game, a book, and music.

11. A server that makes a request of an electrified vehicle with a driver and a passenger to participate in a demand response for adjusting supply or demand of electric power in a power grid, the server comprising:
    a processor; and
    a memory storing a program that is executable by the processor, wherein
    the processor is configured to
        acquire passenger information on at least one of an attribute and a preference of the passenger,
        set an incentive for prompting the passenger to participate in the demand response based on the passenger information,
        send a message with the incentive to the passenger, and
        based upon the passenger accepting the request to participate in the demand response, execute remote control of the electrified vehicle to cause the electrified vehicle to supply power to an electric vehicle power supply charger that is connected to the power grid.

* * * * *